United States Patent
Nishimura

(10) Patent No.: US 8,898,677 B2
(45) Date of Patent: Nov. 25, 2014

(54) DATA ARRANGEMENT CALCULATING SYSTEM, DATA ARRANGEMENT CALCULATING METHOD, MASTER UNIT AND DATA ARRANGING METHOD

(75) Inventor: Shoji Nishimura, Tokyo (JP)

(73) Assignee: NEC Corporation, Tokyo (JP)

( * ) Notice: Subject to any disclaimer, the term of this patent is extended or adjusted under 35 U.S.C. 154(b) by 213 days.

(21) Appl. No.: 13/514,229

(22) PCT Filed: Nov. 24, 2010

(86) PCT No.: PCT/JP2010/070854
§ 371 (c)(1),
(2), (4) Date: Jun. 6, 2012

(87) PCT Pub. No.: WO2011/070910
PCT Pub. Date: Jun. 16, 2011

(65) Prior Publication Data
US 2012/0246661 A1 Sep. 27, 2012

(30) Foreign Application Priority Data
Dec. 7, 2009 (JP) ................. 2009-277521

(51) Int. Cl.
G06F 9/46 (2006.01)
G06F 9/50 (2006.01)
(52) U.S. Cl.
CPC ............ *G06F 9/50* (2013.01); *G06F 17/20545* (2013.01)
USPC ............................ 718/106; 709/208; 709/238
(58) Field of Classification Search
None
See application file for complete search history.

(56) References Cited

U.S. PATENT DOCUMENTS

2006/0195608 A1 8/2006 Tanaka et al.

FOREIGN PATENT DOCUMENTS

| JP | 11-120151 A | 4/1999 |
| JP | 2002-358293 A | 12/2002 |
| JP | 2003-248667 A | 9/2003 |
| JP | 2006-236123 A | 9/2006 |
| JP | 2006-252394 A | 9/2006 |
| JP | 2007-244887 A | 9/2007 |

OTHER PUBLICATIONS

Cardona et al, A Grid based system for data mining using MapReduce, 2007, 12 pages.*
Keisuke Nishida, "Technique for supporting Google-Inside world of huge system", Gizyutu-Hyouron-sya, Apr. 25, 2008, pp. 97-99 and pp. 149-152.
International Search Report for PCT/JP2010/070854 dated Jan. 25, 2011.

* cited by examiner

Primary Examiner — Diem Cao
(74) Attorney, Agent, or Firm — Sughrue Mion, PLLC

(57) ABSTRACT

A data arrangement calculating system including a master unit and a plurality of slave units connected with said master unit. The master unit includes a data arranging section and a job allocating section. The data arranging section includes a data dividing section and an arranging section configured to arrange a first block of the blocks in a first slave unit of the plurality of slave units as an owner block, and arrange the replica block of a second block of the blocks next to the first block in the first slave unit. The first slave unit includes a data retaining section configured to retain said first block and the replica block of said second block and a job executing section. The job executing section executes the sliding window calculation by using the first block and the replica block of the second block.

16 Claims, 8 Drawing Sheets

Fig. 4

| KEY | DATA |
|---|---|
| Usr1-00:00:00 | X:10112234, Y:12334744 |
| Usr1-00:00:10 | X:10112353, Y:12334214 |
| Usr1-00:00:20 | X:10112364, Y:12334647 |
| Usr1-00:00:30 | X:10113299, Y:12336738 |
| Usr1-00:00:40 | X:10112934, Y:12337487 |
| Usr1-00:00:50 | X:10113246, Y:12337822 |
| Usr1-00:01:00 | X:10113237, Y:12335270 |
| Usr1-00:01:10 | X:10113285, Y:12332203 |
| ⋮ | ⋮ |
| Usr999-23:59:50 | X:31262359, Y:42332740 |

Fig. 5

| BLOCK ID | START KEY | END KEY | Owner | Replica |
|---|---|---|---|---|
| blk0000 | Usr1-00:00:00 | Usr1-00:01:30 | 1 | 64 |
| blk0001 | Usr1-00:01:40 | Usr1-00:03:10 | 4 | 1 |
| ⋮ | ⋮ | ⋮ | ⋮ | ⋮ |
| blk9999 | Usr999-23:58:20 | Usr999-23:59:50 | 3 | 2 |

Fig. 6

```
1:scan_by_window(/^(.*):00$/,/^¥1:50$/)do|window|
2:ave_position=calc_ave_position(window)
3:emit(ave_position)
4:end
```

DATA ARRANGEMENT CALCULATING SYSTEM, DATA ARRANGEMENT CALCULATING METHOD, MASTER UNIT AND DATA ARRANGING METHOD

CROSS REFERENCE TO RELATED APPLICATIONS

This application is a National Stage of International Application No. PCT/JP2010/070854filed Nov. 24, 2010, claiming priority based on Japanese Patent Application No. 2009-277521 filed Dec. 7, 2009, the contents of all of which are incorporated herein by reference in their entirety.

TECHNICAL FIELD

The present invention is related to a data arrangement calculating system, especially to a data arrangement calculating system which executes a sliding window calculation.

BACKGROUND ART

As an example of a data arrangement calculating system, Bigtable which manages large-scale data is described in Non-Patent Literature 1. The Bigtable is a system in which a table is divided into tablets which are distributed to and managed by a plurality of servers. The Bigtable has a feature that the table can have the tremendous size and at the same time can be distributed to many servers. In such a system in which data is divided in a suitable size, and managed over a plurality of servers, the sliding window calculation becomes possible according to the key data. The sliding window calculation is a calculating method in which a series of data arranged in an order such as time series data is sequentially calculated every specific section. For example, the sliding window calculation is used to calculate a moving average of stock market and to calculate a place where a user stays and a stay time from a time series of position data of a user.

Also, the data processing of a calculation model called MapReduce is described in Non-Patent Literature 1. The MapReduce is divided into Map processing and Reduce processing. The Map processing is filter calculation processing which is executed in a server which has data. The Reduce processing gathers data sets related to a key as the result of the Map processing, and executes reduction calculation. When carrying out the sliding window calculation by using the MapReduce, the Map processing relates records by using as the key, a window to which each record belongs. In the Reduce processing, the sliding window calculation is carried out to the records related to the key every window.

Also, in a highly performance computation field, the optimization technique which is called SHADOW is known (for example, refer to Patent Literature 1). As described in Patent Literature 1, so-called SHADOW directive is defined in the specification of HPF (High Performance Fortran). This is a method of dividing data so as to overlap in an area called a shadow area, when the data is distributed into a plurality of computers, as shown in FIG. 2 of Patent Literature 1. In other words, by a program developer specifying the shadow area explicitly by the SHADOW directive, it is made possible for a compiler to distribute the areas so that the portions overlap.

CITATION LIST

[Patent Literature 1] JP H11-120151A
[Non-Patent Literature 1] "Technique for supporting Google-Inside world of huge system" by Keisuke NISHIDA (Gizyutu-Hyouron-sya, Apr. 25, 2008, pp. 97-99, and 149-152)

SUMMARY OF THE INVENTION

In a system in which data is divided in a suitable size, and stored over a plurality of servers, like the above-mentioned Bigtable, the sliding window calculation can be carried out according to a key. In such a system, however, there is a problem that a window extends over a data division boundary depending on the window size.

Also, in MapReduce, too, there is a problem in the sliding window calculation. In the Map processing, because calculation is executed in a server which has data, a communication cost is not taken. On the other hand, in the Reduce processing, because the data sets related to the key must be gathered, the communication cost becomes large. Therefore, in MapReduce, the Reduce processing to the data set can be locally executed after the Map processing. However, when there is a window which extends over the data division boundary, the local Reduce processing cannot be executed after the Map processing, because the data which should be accommodated in an identical window is distributed on the plurality of servers. Therefore, in MapReduce, when there are records contained in the window which extends over the data division boundary, it is necessary to carry out the sliding window calculation after gathering the records in the identical server once. Thus, the efficiency of the sliding window calculation is deteriorated.

The optimization technique using the SHADOW area in Patent Literature 1 is very effective, but the program developer needs to know the width of the SHADOW area in advance. In this technique, when the program developer wants to test various window widths through the trial and error, there is a problem that the SHADOW area must be set every time of the calculation and the data must be re-distributed. Moreover, because this method is under assumption that one process occupies data sets and a calculation system, the calculation cannot be executed to the identical data sets in the plurality of window widths in parallel. In other words, the system which realizes this method is configured to calculate a necessary portion every calculation and only the area is copied in case of calculation start. In this way, there is a problem that the sliding window calculation of various window widths to the same data set can not be executed at a same time in this method.

One feature of the present invention is to provide a data arrangement calculating system which can carry out a sliding window efficiently, even if a window extends over a data division boundary when the sliding window calculation is carried out to data distributedly arranged.

A data arrangement calculating system of the present invention includes: a master unit which has data of a plurality of records arranged in order based on a predetermined key and a job which executes sliding window calculation every predetermined window width; and a plurality of slave units connected with the master unit. The master unit includes: a data arranging section configured to divide the data to arrange in the plurality of slave units; and a job allocating section configured to allocate the job to each of the plurality of slave units. The data arranging section includes: a data dividing section configured to divide the data and generate blocks and replicas of the blocks; and an arranging section configured to arrange a first block of the blocks in a first slave unit of the plurality of slave units as an owner, and arrange the replica of a second block next to the first block in the order of the predetermined key in the first slave unit as a replica. The first slave unit includes: a data retaining section configured to retain the first block and the replica of the second block; and a job executing section configured to receive the job and execute the sliding window calculation every the predetermined window width to the first block. The job executing section executes the sliding window calculation by using the first block and the replica of the second block when the predetermined window width extends over the first block and the replica of the second block.

The data arranging method by the present invention includes: a master unit dividing data of records arranged in order based on a predetermined key; the master unit arranging the data which has been divided, in a plurality of slave units; the master unit allocating a job which executes sliding window calculation every predetermined window width to each of the plurality of slave units; and each of the plurality of slave units executing the sliding window calculation based on the allocated job. The dividing includes: dividing the data to generate blocks and replicas of the blocks. The arranging includes: arranging a first block of the blocks as an owner in a first slave unit of the plurality of slave units; and arranging the replica of the second block next to the first block based on the order of the predetermined key in the first slave unit as a replica. The executing includes: the first slave unit receiving the job and executing the sliding window calculation every the predetermined window width to the first block. The first slave unit executing includes: executing the sliding window calculation by using the first block and the replica of the second block, when the predetermined window width extends over the first block and the replica of the second block.

The master unit of the present invention includes a data arranging section configured to divide data of records arranged in an order according to predetermined key to arrange in a plurality of slave units; and a job allocating section configured to allocate the job which executes a sliding window calculation every predetermined window width to each of the plurality of slave units. The data arranging section includes a data dividing section configured to divide data to generate blocks and replicas of the blocks, and an arranging section configured to arrange a first block of the blocks in a first slave unit of the slave units as an owner, and the replica of a second block next to the first block in the order of a predetermined key, in the first slave unit as a replica.

A data arranging method of the present invention includes: dividing data of a plurality of records arranged in an order based on a predetermined key; arranging the divisions of the data in a plurality of slave units; and allocating a job which executes a sliding window calculation every predetermined window width to each of the plurality of slave units. The dividing includes: generating a plurality of blocks and replicas of the plurality of blocks. The arranging includes: arranging a first block of the plurality of blocks in a first slave unit of the plurality of slave units as an owner; and arranging the replica of a second block next to the first block in the order of the predetermined key in the first slave unit as a replica.

The storage medium of the present invention stores a computer-executable program code to realize a data arranging method. The data arranging method includes: dividing data of a plurality of records arranged in an order based on a predetermined key; arranging the divisions of the data in a plurality of slave units; and allocating a job which executes a sliding window calculation every predetermined window width to each of the plurality of slave units. The dividing includes: generating a plurality of blocks and replicas of the plurality of blocks. The arranging includes: arranging a first block of the plurality of blocks in a first slave unit of the plurality of slave units as an owner; and arranging the replica of a second block next to the first block in the order of the predetermined key in the first slave unit as a replica.

The data arrangement calculating system of the present invention can carry out a sliding window calculation efficiently, even if a window extends over a data division boundary when the sliding window calculation is carried out to data distributedly arranged.

BRIEF DESCRIPTION OF THE DRAWINGS

The objects, effect, features of the present invention would become clearer from exemplary embodiments in conjunction with the attached drawings:

FIG. 4 is a diagram showing data in which pairs of a user ID and time are arranged in order for a sliding window calculation according to time series every user;

FIG. 5 is an example of arrangement data showing how blocks are arranged in the slave units;

FIG. 6 is an example of a job;

DESCRIPTION OF EXEMPLARY EMBODIMENTS

Hereafter, a data arrangement calculating system, a data arrangement calculating method, a master unit, a data arranging method, a data arranging program and a storage medium according to exemplary embodiments of the present invention will be described with reference to the attached drawings.

[First Exemplary Embodiment]

Figure 1:
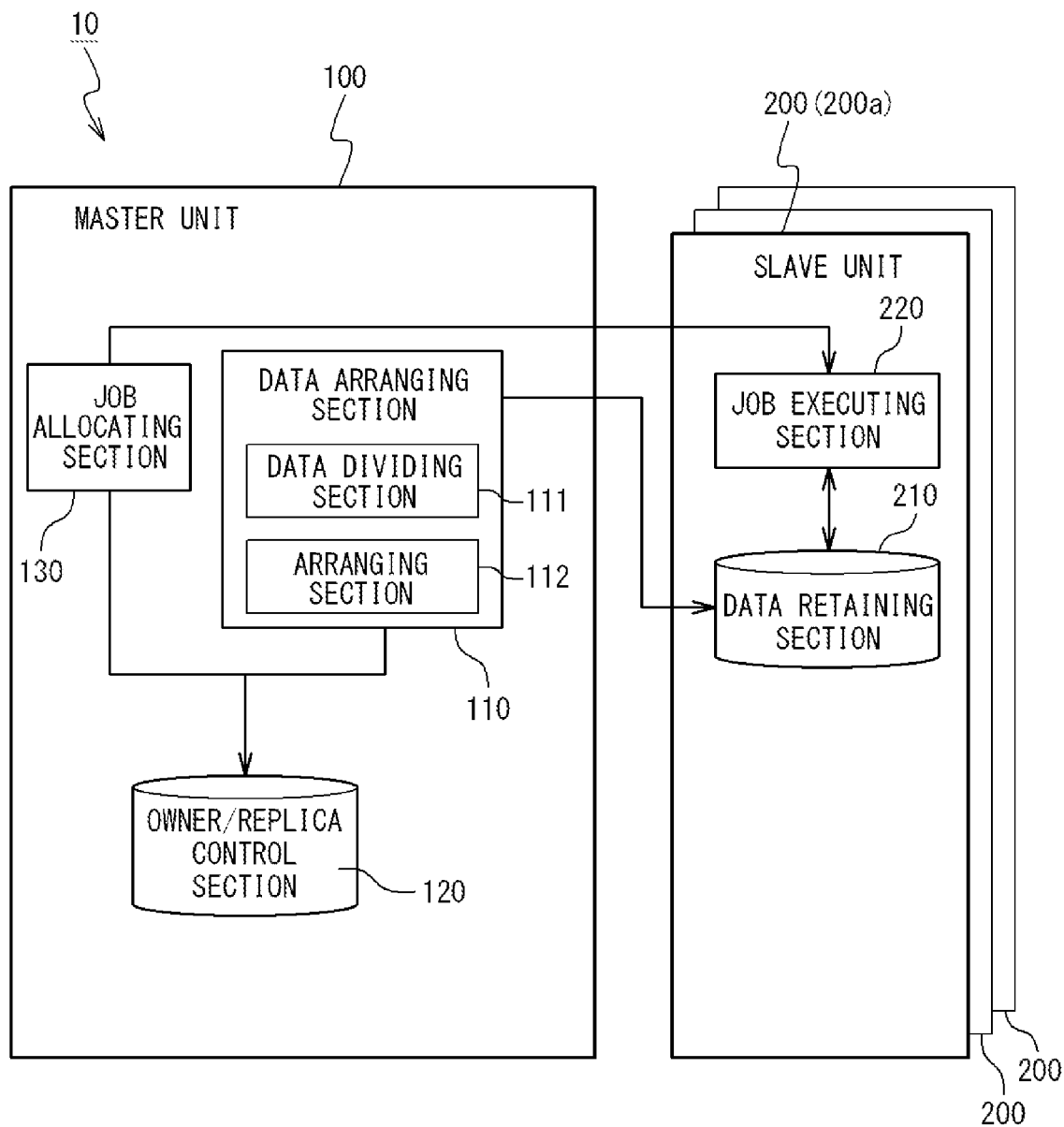
FIG. 1 is a block diagram showing a configuration example of a data arrangement calculating system 10 according to a first exemplary embodiment of the present invention.

A first exemplary embodiment of the present invention will be described. FIG. 1 is a block diagram showing a configuration of a data arrangement calculating system 10 according to the first exemplary embodiment of the present invention. Referring to FIG. 1, the data arrangement calculating system 10 is provided with a master unit 100 and a plurality of slave units 200. The master unit 100 has data which have a plurality of records arranged in the order of key data of a predetermined key, and a job which executes a sliding window calculation every predetermined window width. The plurality of slave units 200 are connected with the master unit 100.

First, the master unit 100 will be described. The master unit 100 is provided with a data arranging section 110, an owner/replica control section 120 and a job allocating section 130.

The data arranging section 110 divides the data having the plurality of records arranged in the order of key data of the predetermined key into the records and arranges the records to the plurality of slave units 200. The data arranging section 110 is provided with a data dividing section 111 and an arranging section 112.

The data dividing section 111 receives the data having the plurality of records from an external system (not shown). The data dividing section 111 re-arranges the plurality of records in the order of sliding window calculation to be executed in the plurality of slave units 200 according to the key data of the records. For example, when the sliding window calculation of the plurality of records should be carried out in time series in the slave units 200, the data dividing section 111 arranges the plurality of records in the order of key data of the key of time. The data dividing section 111 divides the data to reflect the order of the key data contained in the plurality of records, and generates a plurality of blocks. At this time, the data dividing section 111 may divide the data in units of sizes set previously and may divide the data in units of previously set record counts. After that, the data dividing section 111 generates a plurality of replica blocks of the plurality of blocks. The data dividing section 111 provides the plurality of blocks and the plurality of replica blocks to the arranging section 112.

The arranging section 112 receives the plurality of blocks and the plurality of replica blocks. The arranging section 112 arranges each of the plurality of blocks to one of the plurality of slave units 200 as an owner. At this time, it is desirable that the arranging section 112 arranges the blocks as owner blocks uniformly to all the slave units 200. It should be noted that an optional block arranged in each slave unit 200 as the owner is called an "owner block". For example, the arranging section 112 arranges a first block in a slave unit 200*a* of the plurality of slave units 200 as the owner in the order of key data.

Also, the arranging section 112 arranges a replica of the block next to the owner block in the order of key data in the slave unit 200 as a replica. It should be noted that the block arranged in each slave unit 200 is called a "replica block". For example, the arranging section 112 arranges a replica of a second block next to a first block in the order of key data in the slave unit 200*a* as the replica.

Moreover, the arranging section 112 generates arrangement data in which each block is related to one of the plurality of slave units 200 as the owner block and the replica of each block is related to one of the slave units 200 as the replica block. For example, the arranging section 112 generates the arrangement data in which the first block is related to the slave unit 200*a* and the replica of the second block is related to the slave unit 200*a*. The arranging section 112 supplies the generated arrangement data to the owner/replica control section 120.

The owner/replica control section 120 stores the arrangement data received from the arranging section 112.

The job allocating section 130 receives a job from an external system (not shown) to execute the sliding window calculation every window width. The job allocating section 130 allocates the received job to each of the plurality of slave units 200. In detailed, when receiving the job, the job allocating section 130 refers to the arrangement data in the owner/replica control section 120. The job allocating section 130 recognizes a kind of the key data which define the order of the plurality of records contained in the owner block. The job allocating section 130 extracts the key data which define the order from the plurality of records contained in the owner block. The job allocating section 130 allocates the extracted key data and the job to the slave unit 200 in which the owner block is arranged. For example, the job allocating section 130 refers to the arrangement data to recognize as a key, time which is the kind of key data defining the order of the plurality of records contained in the first block as owner block. The job allocating section 130 extracts the key data corresponding to the key of time from the first block. The job allocating section 130 allocates the job and the extracted key data to the slave unit 200*a* in which the first block is arranged as the owner block. It should be noted that a specific example of the job allocation will be described later.

Next, the plurality of slave units 200 will be described. Each slave unit 200 is provided with a data retaining section 210 and a job executing section 220.

The data retaining section 210 receives the owner block and the replica block from the data arranging section 110 and stores them. For example, the data retaining section 210 of the slave unit 200*a* stores the first block as the owner block and stores the replica of the second block as the replica block.

The job executing section 220 receives the job and the plurality of key data defining the order of the plurality of records contained in the owner block from the job allocating section 130. The job executing section 220 executes the sliding window calculation every predetermined window width set by the job to the owner block stored in the data retaining section 210. At this time, the job executing section 220 executes the sliding window calculation by using the plurality of key data defining the order as start keys of the predetermined window widths. When the predetermined window width extends over the owner block and the replica block, the job executing section 220 executes the sliding window calculation by using the replica block in addition to the owner block. For example, the job executing section 220 of the slave unit 200*a* receives the job and the extracted key data of time from the job allocating section 130. The job executing section 220 executes the sliding window calculation to the first block by using the plurality of time key data as the start keys of window widths. When the window width extends over the replica of the second block, the job executing section 220 of the slave unit 200*a* uses the first block and the replica of the second block and executes the sliding window calculation.

Because the owner block and the replica block are arranged in each slave unit 200, the data arrangement calculating system 10 of the present invention can execute the sliding window calculation efficiently by using the replica block, even when the window width exceeds the size of the owner block.

Figure 2:
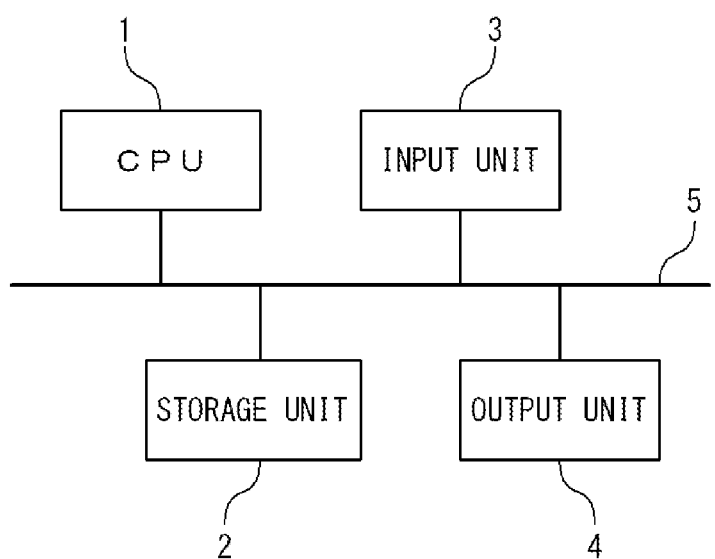
FIG. 2 is a block diagram showing a hardware configuration example of a master unit 100 and slave units 200 in the exemplary embodiment of the data arrangement calculating system 10.

The data arrangement calculating system 10 according to the exemplary embodiment of the present invention is feasible by using a computer. FIG. 2 is a block diagram showing a hardware configuration example of the master unit 100 and the slave unit 200 in the exemplary embodiment of the data arrangement calculating system 10. Referring to FIG. 2, each of the master unit 100 and the slave units 200 of the present invention is configured of a computer system which is provided with a CPU (Central Processing Unit) 1, a storage unit 2, an input unit 3, an output unit 4 and a bus 5 which connects the units.

The CPU 1 carries out calculation processing and control processing according to the data arrangement calculating system 10 of the present invention based on a program stored in the storage unit 2. The storage unit 2 is a unit storing data such as a hard disk and a memory unit. The storage unit 2 stores a program read from a computer-readable storage medium such as a CD-ROM and DVD, a program downloaded through a network (not shown), a signal and a program supplied from the input unit 3 and a processing result of the CPU 1. The input unit 3 is a unit such as a mouse, a keyboard, and a microphone by which the user can input a command and a signal. The output unit 4 is a unit such as a display and a speaker to make a user recognize an output. It should be noted that the present invention is not limited to the hardware configuration example and may be realized by either or a combination of a hardware component and a software component.

Figure 3:
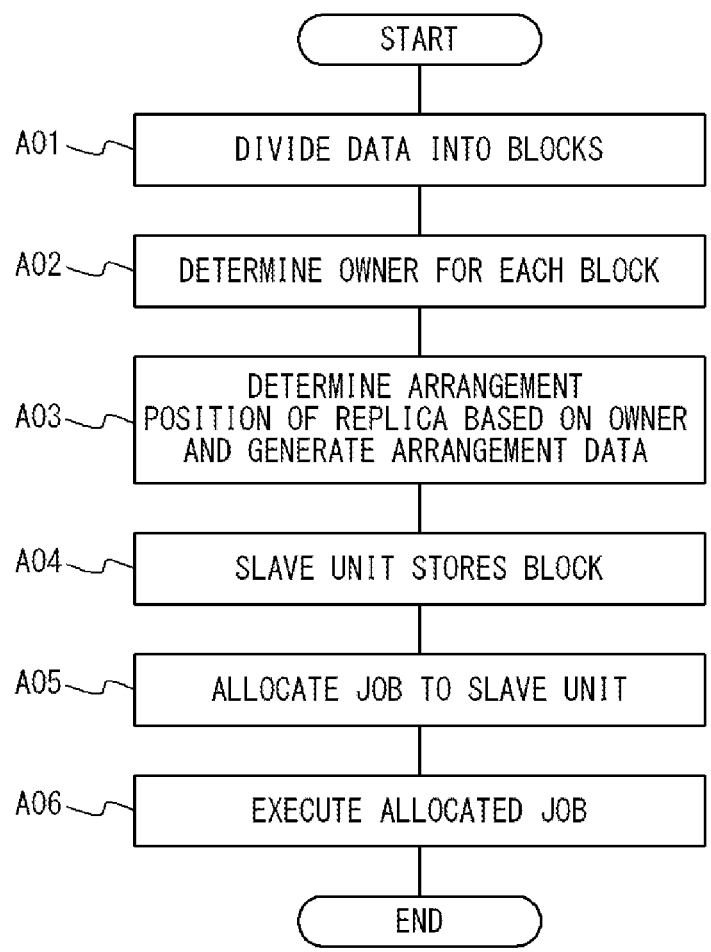
FIG. 3 is a flow chart showing a processing operation of the data arrangement calculating system 10 according to the first exemplary embodiment of the present invention.

FIG. 3 is a flow chart showing a processing operation of the data arrangement calculating system 10 according to the first exemplary embodiment of the present invention. With reference to FIG. 3, the processing operation of the data arrangement calculating system 10 according to the first exemplary embodiment of the present invention will be described.

Step A01:

The data dividing section 111 receives data of a plurality of records from an external system (not shown). The data dividing section 111 re-arranges the plurality of records contained in the data, in the order of the sliding window calculation based on the key data of each record in each of the plurality of slave units 200. The data dividing section 111 divides the data to reflect the order of the plurality of records based on the key data and generates a plurality of blocks. After that, the data dividing section 111 generates replica blocks of the plurality of blocks. The data dividing section 111 supplies the plurality of blocks and the plurality of replica blocks to the arranging section 112.

Step A02:

The arranging section 112 arranges each of the plurality of blocks to one of the plurality of slave units 200 as an owner. That is, the arranging section 112 determines the owner of each block. At this time, it is desirable that that the arranging section 112 arranges the blocks to uniformly distribute to all the slave units 200 as the owner blocks.

Step A03:

The arranging section 112 determines arrangement positions of the replica blocks based on the arrangement positions of the owner blocks. The arranging section 112 generates the arrangement data related to the owner block, the replica block and each slave unit 200. In detail, the arranging section 112 arranges a replica of the block next to the owner block in the order of key data in the slave unit 200 as the replica block. The arranging section 112 generates the arrangement data in which each block is related to one slave unit 200 as the owner block and the replica of each block is related to one slave unit 200 as the replica block. The arranging section 112 supplies the generated arrangement data to the owner/replica control section 120. The owner/replica control section 120 stores the arrangement data received from the arranging section 112.

Step A04:

The data retaining section 210 of each slave unit 200 receives the owner block and the replica block from the data arranging section 110 of the master unit 100 and stores them.

Step A05:

The job allocating section 130 receives a job, which executes the sliding window calculation every predetermined window width, from an external system (not shown). The job allocating section 130 allocates the received job to each of the plurality of slave units 200. In detail, when receiving the job, the job allocating section 130 refers to the arrangement data in the owner/replica control section 120. The job allocating section 130 recognizes a kind of the key data which define the order of the plurality of records contained in the owner block.

The job allocating section 130 extracts the key data which defines the order of the plurality of records contained in the owner block. The job allocating section 130 allocates the extracted key data and the job to the slave unit 200 in which the owner block is arranged.

Step A06:

The job executing section 220 executes the allocated job. In detail, the job executing section 220 receives the job and the plurality of key data which define the order of the records of the owner block, from the job allocating section 130. The job executing section 220 executes the sliding window calculation every window width set by the job, to the owner block stored in the data retaining section 210.

At this time, the job executing section 220 executes the sliding window calculation by using the plurality of key data which define the order as start keys of the window widths. When the window width extends over the owner block and the replica block, the job executing section 220 executes the sliding window calculation by using the replica block in addition to the owner block.

In the data arrangement calculating system 10 according to the first exemplary embodiment of the present invention, the master unit 100 may arrange a replica of a block next to the owner block in each slave unit 200 as the replica block in addition to the owner block. The master unit 100 can allocate the job to the owner block to each slave unit 200. As a result, in case of the sliding window calculation by the job, each slave unit 200 can complete the sliding window calculation only by using local accesses, when there is a window extending over the division boundary of the blocks. Also, in the data arrangement calculating system 10 according to the first exemplary embodiment of the present invention, it is not necessary to specify a SHADOW area every sliding window calculation, and the efficiency of the sliding window calculation can be improved, because each slave unit 200 stores the owner block and the replica block.

Here, using a specific instance, the data arrangement calculating system of the present invention will be described. The data arrangement calculating system of the present invention can be divided into a master server (the master unit 100) which carries out the arrangement of the data and the allocation of the job, and a plurality of slave servers (slave units 200) which carry out the storage of the data and execution of the job.

First, the arrangement of the data will be described. When receiving a data storage request from a client, the master server divides data into blocks and distributedly arranges them in the slave servers.

As a method of dividing into the blocks, the data may be divided in units of a previously set size and may be divided in units of a previously set record count. At this time, the master server sorts the records in the order of the sliding window calculation by the slave servers and then divides the records into the blocks. For example, in order to control the slave servers to carry out the sliding window calculation in time series, the master server arranges the records in the time series and stores them. FIG. 4 is a diagram showing the data arranged in order based on a set of a user ID and time to calculate the sliding window in time series for every user.

Next, the master server distributedly arranges the blocks in any of the slave servers. As the distribution arrangement methods, for example, there are exemplified a method of allocating to the slave servers in round robin, a method of allocating to the slave servers randomly, and a method of allocating the adjacent blocks to the slave servers which are in different racks, so as to reduce damage in case of a fault occurrence, in consideration of the allocation of the replica to be described later. The load distribution is achieved at the execution time of the job by arranging uniformly to all the slave servers.

The distribution arrangement of the replica blocks will be described. In case of allocating a block as the replica block, the master server allocates to the slave server to which the block previous to the block is allocated as the owner block. For example, it is supposed that a block 1 is arranged to the slave sever X as the owner block. At this time, it is supposed that a block 2 is a block next to the block 1. In other words, the block 1 is a block previous to the block 2. Therefore, a replica of the block 2 is arranged as the replica block in the slave server X.

FIG. 5 is an example of the arrangement data showing a condition that the blocks are arranged in the slave servers. In this example, the arrangement data has items of a block ID, a start key, an end key, the owner, and the replica. The block ID is used to identify each block uniquely. The start key and the end key are keys of the head and last records of each block. The owner is an ID of the slave server which retains the block as the owner block. The replica is an ID of the slave server which retains the block as the replica block. It should be noted that the arrangement data may be stored in any format if it can be expressed that each block retains which of the records and by which of the slave servers, the block is retained as the owner block or the replica block. Also, each block may be allocated to the plurality of slave servers as the owner block or the replica block. The cost of the data re-arrangement and the shortening of the recovery time can be realized in case of the fault occurrence by allocating of the plurality of blocks.

The division of the job will be described. FIG. 6 is an example of the job. In this case, an example of the job will be described in which the sliding window calculation is carried out to calculate the averages of the values of X and Y every minute to the data of the records, each of which expresses the position (X, Y) every 10 seconds and every user as shown in FIG. 4. It should be noted that the data of FIG. 4 are supposed to be distributedly arranged every 10 records. The "scan_by_window" function on the first line in FIG. 6 indicates the extraction of a pattern matching to the key data which indicate a start point and an end point of the window. Here, the records from the record starting with the key data of " . . . :00" to the record ending with " . . . :50" are extracted as the window. Then, the average position is determined (on the second line) by using the code from "do" on the first line to "end" on the fourth line to end, and the result is outputted (on the third line). For example, in FIG. 4, the records from "Usr1-00:00:00" to "Usr1-00:00:50" and from "Usr1-00:01:00" to "Usr1-00:01:50" are extracted as the windows, respectively.

The division of the job is carried out as follows. The master server refers to the arrangement data of FIG. 5 to transfer the job to be executed and a range to be read as the start keys to the slave server which has the block as the owner block. For example, the slave server "1" retains the block as the owner block which has the records in the range from "Usr1-00:00:00" to "Usr1-00:01:30". Therefore, the master server allocates the plurality of key data in the range from "Usr1-00:00:00" to "Usr1-00:01:30" to the slave server "1" as the range to be read as the start keys. That is, the master server allocates the job which executes the calculation to the range of those key data.

The slave server "1" searches the record which has the start key of " . . . :00" from the head of the block retaining as the owner block. In this case, the record related to "Usr1-00:00:00" matches. Next, the slave server "1" searches the record having the end key of " . . . :50" and recognizes that "Usr1-00:00:50" matches. Therefore, the slave server "1" handles the records in the range of "Usr1-00:00:00" to "Usr1-00:00:50" as one window and calculates the average position and outputs as the result. Similarly, the slave server "1" searches records having the start key and the end key of the following window and executes calculation of a window in the range from "Usr1-00:01:00" to "Usr1-00:01:50". At this time, because the slave server "1" does not have the records having the keys of "Usr1-00:01:40" and "Usr1-00:01:50" in the owner block but the records are arranged to have locally as the replica block, the sliding window calculation can be realized only by using the local accesses. Moreover, the slave server "1" searches the start key of the following window but because the start key is not searched in a range (the range from Usr1-00:00:00 to Usr1-00:01:30), the job is ended. In this way, the job related to the range from the start key to the end key in the block as the owner block is allocated to each slave server.

[Second Exemplary Embodiment]

Figure 7:
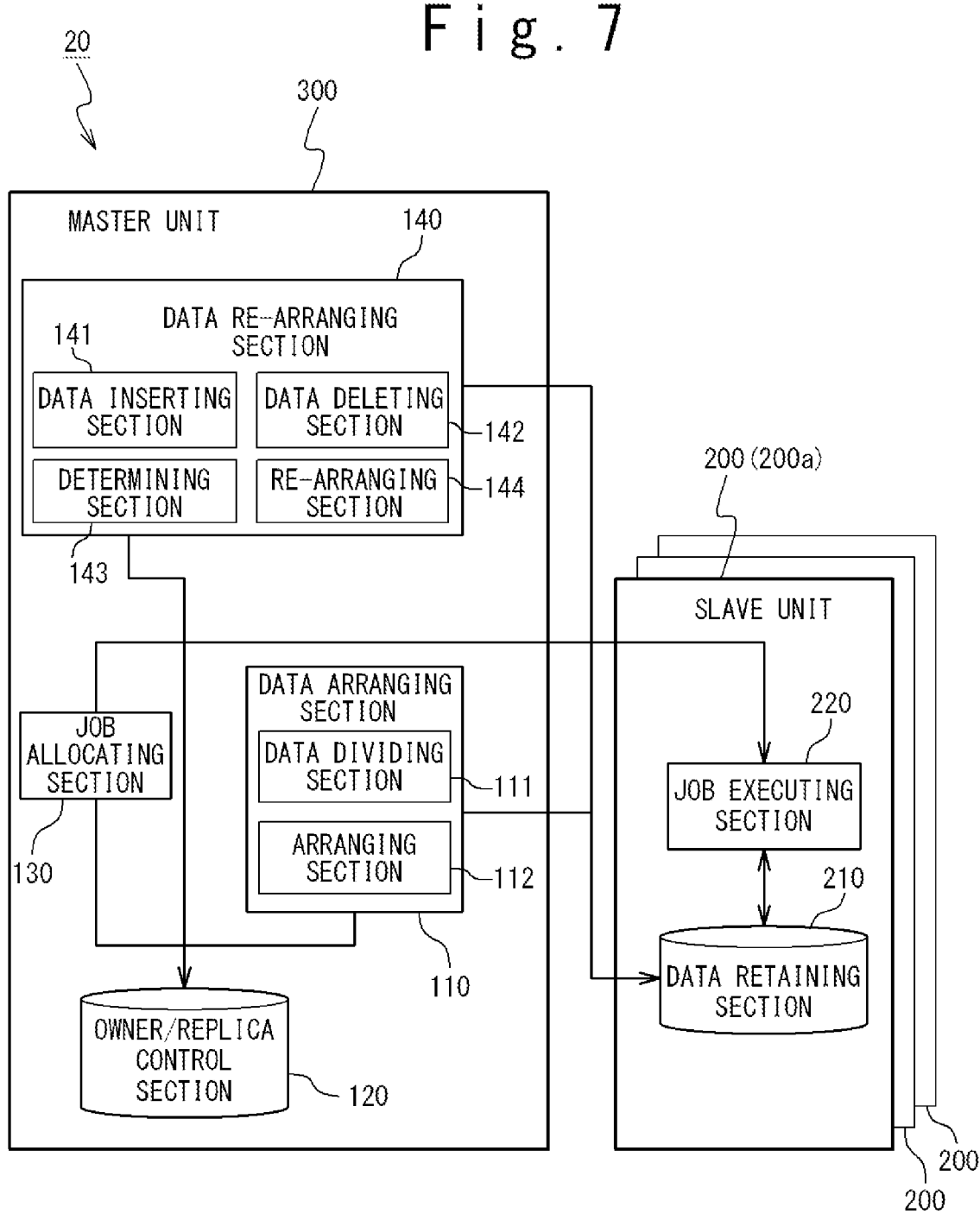
FIG. 7 is a block diagram showing a configuration example of a data arrangement calculating system 20 according to a second exemplary embodiment of the present invention.

A second exemplary embodiment of the present invention will be described. FIG. 7 is a block diagram showing the configuration of a data arrangement calculating system 20 according to the second exemplary embodiment of the present invention. In the data arrangement calculating system 20 according to the second exemplary embodiment of the present invention, a function of the insertion and deletion of data to the data arranged in the first exemplary embodiment is added. It should be noted that in the description of the second exemplary embodiment of the present invention, the same reference symbols are allocated to the same components as in the first exemplary embodiment and the description is omitted.

Referring to FIG. 7, the data arrangement calculating system 20 is provided with a master unit 300 and the plurality of slave units 200. The master unit 300 has data of a plurality of records arranged in the order of key data of a predetermined key and a job which executes the sliding window calculation every predetermined window width. Each of the plurality of slave units 200 is connected with the master unit 300.

The master unit 300 will be described. The master unit 300 is provided with the data arranging section 110, the owner/replica control section 120, the job allocating section 130 and a data re-arranging section 140.

The data re-arranging section 140 operates after the data is arranged in each slave unit 200 through the same operation as in the first exemplary embodiment. When receiving data containing a new record from an external system (not shown), the data re-arranging section 140 updates each of the plurality of slave units 200. Also, when receiving a request of deleting a specified record which is contained in the data from the external system (not shown), the data arranging section 140 updates each of the plurality of slave units 200 based on the deletion request. The data re-arranging section 140 is provided with a data inserting section 141, a data deleting section 142, a determining section 143 and a re-arranging section 144.

When receiving data which contains a new record, the data inserting section 141 refers to the arrangement data in the owner/replica control section 120. The data inserting section 141 inserts the new record into the corresponding block based on a key of the same kind as the above-mentioned predetermined key which is contained in the new record. It should be noted that the block into which the new record has been inserted is called an "insertion block". For example, the data inserting section 141 refers to the arrangement data, and inserts the new record into the second block as the insertion block based on a key of the same kind as the predetermined key which is contained in the new record.

When receiving a request of deleting a record which is contained in the block, the data deleting section 142 refers to the arrangement data in the owner/replica control section 120 and deletes the record from the block. It should be noted that the block from which the record has been deleted is called a "deletion block". For example, the record of a deletion target is supposed to be contained in the second block. The data deleting section 142 extracts the second block based on the key data which is contained in the deletion target record, and deletes the record from the second block to generate the deletion block.

The determining section 143 determines whether or not the size of the insertion block is within a threshold value (or whether or not the insertion block is larger than a size). Also, the determining section 143 determines whether or not the size of the deletion block is within a threshold value (whether or not it is smaller than the size).

The re-arranging section 144 will be described. First, a case where the data inserting section 141 receives the data which contains a new record will be described. The re-arranging section 144 divides the insertion block into blocks of a half size when the size of the insertion block is larger than the threshold value, and generates a block F and a block R. It should be noted that the first half of the insertion block is the block F and the second half is the block R. The re-arranging section 144 arranges the block F as the owner block and the replica of block R as the replica block in one of slave units 200.

Next, the re-arranging section 144 re-arranges the replica of block F as the replica block in the slave unit 200 which retains a replica of the block into which the new record is inserted, as the replica block. Moreover, the re-arranging section 144 re-arranges the block R as the owner block in the slave unit 200 which retains the block into which a new record is inserted, as the owner block. The re-arranging section 144 provides the arrangement data after the re-arrangement for the owner/replica control section 120 and updates the arrangement data.

For example, the following conditions are supposed. The first block is arranged as the owner block in the slave unit 200a. The replica of second block is arranged as the replica block in the slave unit 200a. The second block is arranged as the owner block in a slave unit 200b (not shown). The replica of the third block is arranged as the replica block in the slave unit 200b. The re-arranging section 144 divides the insertion block into the block F and the block R when the size of the insertion block in which the new record has been inserted into the second block is larger than the threshold value. The re-arranging section 144 arranges the block F as the owner block and the replica of block R as the replica block in a new slave unit 200c (not shown). The re-arranging section 144 re-arranges the replica of block F as the replica block in the slave unit 200a. Moreover, the re-arranging section 144 re-arranges the block R as the owner block in the slave unit 200b. It should be noted that the re-arranging section 144 deletes the replica of the second block which has been arranged as the replica block in the slave unit 200a block and deletes the second block which has been arranged as the owner block in the slave unit 200b.

On the other hand, when the size of the insertion block is within the threshold value, the re-arranging section 144 inserts the new record into the replica of the block and the block as an insertion target of the new record. For example, the re-arranging section 144 inserts the new record into the replica of the second block which has been arranged as the replica block in the slave unit 200a. Also, the re-arranging section 144 inserts the new record in the second block which has been arranged as the owner block in the slave unit 200b.

Next, a case where the data deleting section 142 receives a request of deleting a record which is contained in the block will be described. When the size of the deletion block is within the threshold value, the re-arranging section 144 generates an integration block by integrating a block next to the deletion block and the deletion block based on the order of key data. The re-arranging section 144 re-arranges the replica of the integration block as the replica block in the slave unit 200 which retains the replica of the block for a record to be deleted, as the replica block. Also, the re-arranging section 144 re-arranges the integration block as the owner block in the slave unit 200 which retains the block next to the deletion block as the owner block. Moreover, the re-arranging section 144 releases the slave unit 200 which retains the block for a record to be deleted, as the owner block (the re-arranging section 144 deletes the owner block and the replica block which have been allocated to the slave unit 200). The re-arranging section 144 provides the arrangement data after the re-arrangement for the owner/replica control section 120 and updates the arrangement data.

For example, it is supposed that the first block and the replica of the second block are arranged as the owner block and the replica block in the slave unit 200a, and the second block and the replica of the third block are arranged as the owner block and as the replica block in the slave unit 200b (not shown), and the third block is arranged as the owner block in the slave unit 200d (not shown).

When the size of the deletion block when a record has been deleted from the second block is smaller than the threshold value, the re-arranging section 144 integrates the deletion block and the third block and generates an integration block. The re-arranging section 144 re-arranges the replica of the integration block as the replica block in the slave unit 200a. Also, the re-arranging section 144 re-arranges the integration block as the owner block in the slave unit 200d. Moreover, the re-arranging section 144 releases the slave unit 200b which retains the second block as the owner block (the re-arranging section 144 deletes the owner block and the replica block which have been allocated to the slave unit 200b). It should be noted that the re-arranging section 144 deletes the replica of the second block which has been arranged as the replica block in the slave unit 200a and deletes the third block which has been arranged as the owner block in the slave unit 200d.

On the other hand, when the size of the deletion block is larger than the threshold value, the re-arranging section 144 deletes the target record from the block and the replica of the block as the deletion target of the record. For example, the re-arranging section 144 deletes the target record from the replica of the second block which has been arranged as the replica block in the slave unit 200a. Also, the re-arranging section 144 deletes the target record from the second block which has been arranged as the owner block in the slave unit 200b.

Figure 8:
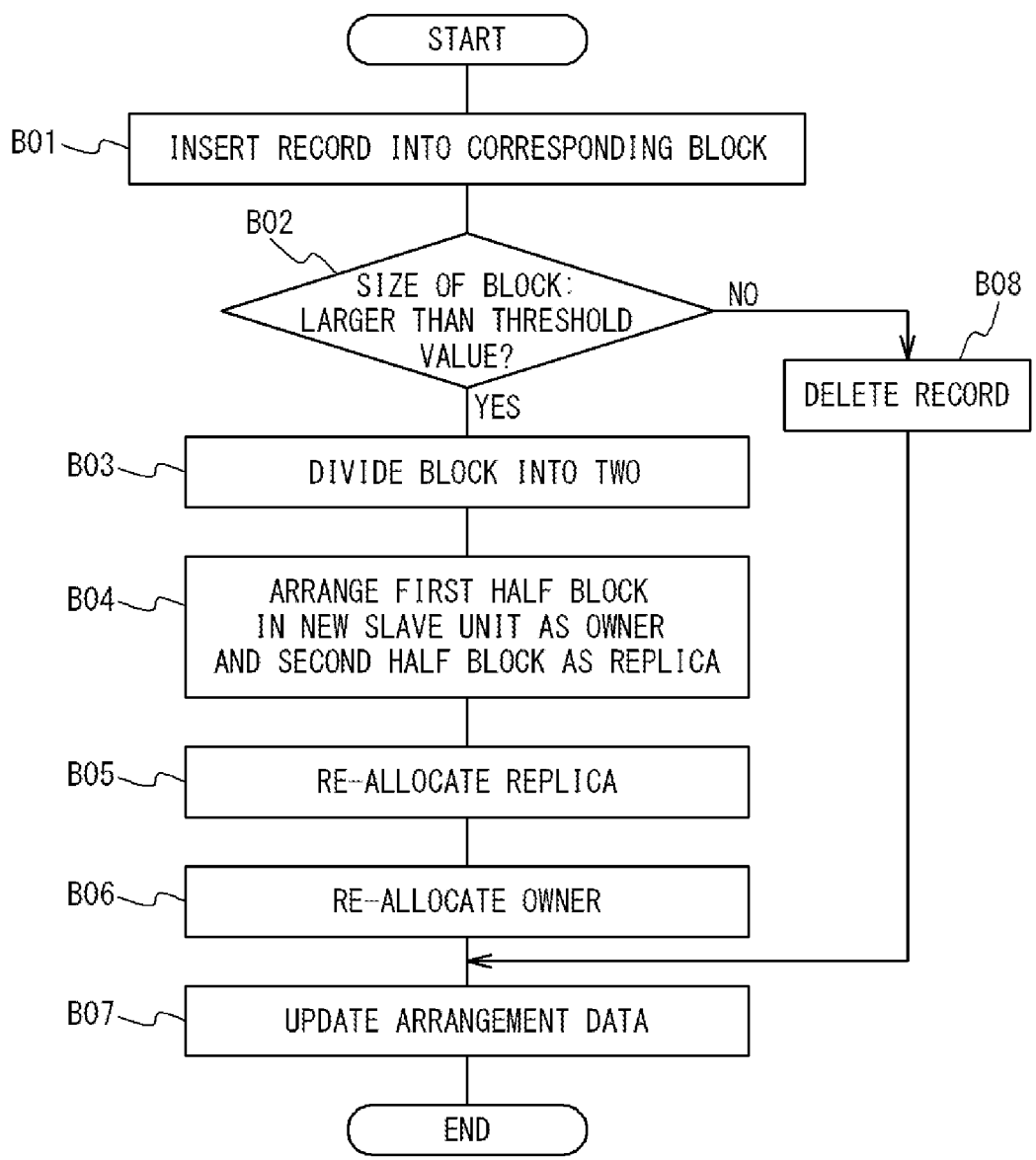
FIG. 8 is a flow chart showing a processing operation of the data arrangement calculating system 20 according to the second exemplary embodiment of the present invention.

FIG. 8 is a flow chart showing the processing operation of the data arrangement calculating system 20 according to the second exemplary embodiment of the present invention. With reference to FIG. 8, the data insertion processing of the data arrangement calculating system 20 will be described. Here, it is supposed that the data arrangement calculating system 20 already distributedly arranges data in the slave units 200 through the same processing as in the first exemplary embodiment.

Step B01:

When receiving the data which contains the new record, the data inserting section 141 refers to the arrangement data in the owner/replica control section 120. The data inserting section 141 inserts the new record in the corresponding block to generate an insertion block, based on the key of the same kind as the above-mentioned key data which is contained in the new record.

Step B02:

The determining section 143 determines whether or not the size of the insertion block is within the threshold value.

Step B03:

At the step B02, when the size of the insertion block is larger than the threshold value (YES), the re-arranging section 144 divides the insertion block into blocks of a half size and generates a block F and a block R. It should be noted that the first half of the insertion block is the block F and the second half is the block R.

Step B04:

The re-arranging section 144 arranges the first half block F as the owner block and the replica of the second half block R as the replica block in the new slave unit 200.

Step B05:

The re-arranging section 144 re-arranges the replica block. In other words, the re-arranging section 144 re-arranges the replica of block F as the replica block in the slave unit 200 which retains the replica of the block for the new record to be inserted as the replica block. It should be noted that the re-arranging section 144 deletes the replica of the block which has been arranged as the replica block in the slave unit 200.

Step B06:

The re-arranging section 144 re-arranges the owner block. In other words, the re-arranging section 144 re-arranges the block R as the owner block in the slave unit 200 which retains the block for the new record to be inserted, as the owner block. It should be noted that the re-arranging section 144 deletes the block which has been arranged as the owner block in the slave unit 200.

Step B07:

The re-arranging section 144 provides the arrangement data after the re-arrangement for the owner/replica control section 120 and updates the arrangement data.

Step B08:

On the other hand, at the step B02, when the size of the insertion block is within the threshold value (NO), the re-arranging section 144 inserts the new record into the block as an insertion target of the new record and the replica of the block.

Figure 9:
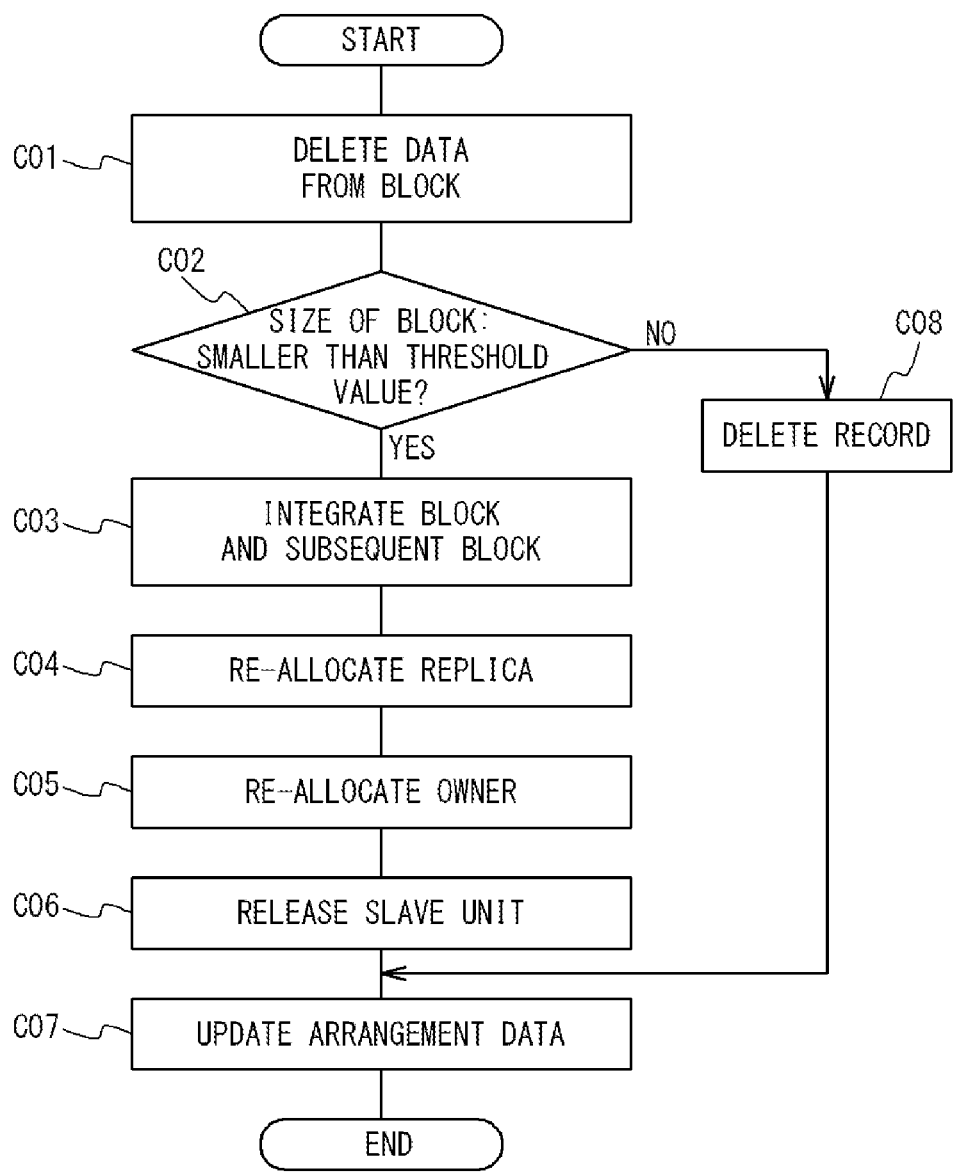
FIG. 9 is a flow chart showing a processing operation of the data arrangement calculating system 20 according to the second exemplary embodiment of the present invention.

FIG. 9 is a flow chart showing the processing operation of the data arrangement calculating system 20 according to the second exemplary embodiment of the present invention. With reference to FIG. 9, the data deletion processing of the data arrangement calculating system 20 will be described. In this case, in the data arrangement calculating system 20, it is supposed that data are already arranged distributedly into the slave units 200 through the same processing as in the first exemplary embodiment.

Step C01:

When receiving a request of deleting the record which is contained in a block, the data deleting section 142 refers to the arrangement data in the owner/replica control section 120, and deletes the record from the block to generate a deletion block.

Step C02:

The determining section 143 determines whether or not the size of the deletion block is within the threshold value.

Step C03:

At the step C02, when the size of the deletion block is within the threshold value (YES), the re-arranging section 144 integrates the block next to the deletion block and the deletion block based on the order of key data, and generates an integration block.

Step C04:

The re-arranging section 144 re-arranges the replica block. In other words, the re-arranging section 144 re-arranges the replica of the integration block as the replica block in the slave unit 200 which retains the replica of the block for the record to be deleted, as the replica block. It should be noted that the re-arranging section 144 deletes the replica of the block which has been arranged as the replica block in the slave unit 200.

Step C05:

The re-arranging section 144 re-arranges the owner block. In other words, the re-arranging section 144 re-arranges the integration block as the owner block in the slave unit 200 which retains the block next to the deletion block, as the owner block. It should be noted that the re-arranging section 144 deletes the block which has been arranged as the owner block in the slave unit 200.

Step C06:

The re-arranging section 144 releases the slave unit 200 which retains the block for the record to be deleted, as the owner block.

Step C07:

The re-arranging section 144 provides the arrangement data after the re-arrangement for the owner/replica control section 120 and updates the arrangement data.

Step C08:

On the other hand, at the step C02, when the size of the deletion block is larger than the threshold value (NO), the re-arranging section 144 deletes the record from the block as the record deletion target and the replica of the block.

The data arrangement calculating system 20 according to the second exemplary embodiment of the present invention can execute the sliding window calculation by efficiently using the replica block even when the window width exceeds the size of the owner block, like the first exemplary embodiment. Moreover, even when the insertion and deletion of data are carried out after the data are arranged in the slave units 200, the data arrangement calculating system 20 according to the second exemplary embodiment of the present invention can re-arrange the owner blocks and the replica blocks by which the insertion and deletion of the data are reflected in each slave unit 200.

As such, the exemplary embodiments (and, implementation examples) of the present invention have been described, but the present invention is not limited to the above exemplary embodiments (and implementation examples). Various modifications can be carried out by a skilled person in the art within the scope of the present invention with respect to the configuration and details of the present invention.

This patent application claims a priority based on Japanese Patent Application No. JP 2009-277521 filed on Dec. 7, 2009. The disclosure thereof is incorporated herein by reference.

The invention claimed is:

1. A data arrangement calculating system comprising:
a master unit which has data of records arranged in order based on key data of said records and a job which executes sliding window calculation every predetermined window width; and
a plurality of slave units connected with said master unit, wherein said master unit comprises:
a data arranging section configured to divide said data to arrange in said plurality of slave units; and
a job allocating section configured to allocate said job to each of said plurality of slave units,
wherein said data arranging section comprises:
a data dividing section configured to generate blocks and replica blocks of said blocks by dividing said data; and an arranging section configured to arrange a first block of said blocks in a first slave unit of said plurality of slave units as an owner block, and arrange the replica block of a second block of said blocks next to said first block in said first slave unit, wherein said first slave unit comprises:

a data retaining section configured to retain said first block and the replica block of said second block; and a job executing section configured to receive said job and execute said job to carry out the sliding window calculation every said predetermined window width to said first block, and wherein said job executing section executes the sliding window calculation by using said first block and the replica block of said second block when the predetermined window width extends over said first block and the replica block of said second block.

2. The data arrangement calculating system according to claim 1, wherein in said master unit, said arranging section generates arrangement data in which said first block is related to said first slave unit as the owner block, and the replica block of said second block is related to said first slave unit as the replica block, wherein said job allocating section refers to said arrangement data to recognize a kind of the key data defining the order of first records of said first block, and allocates a plurality of first key data corresponding to the kind and said job to said first slave unit, and wherein in said first slave unit, said job executing section executes the sliding window calculation every said predetermined window width by using the plurality of first key data as start keys.

3. The data arrangement calculating system according to claim 2, further comprising:

a data re-arranging section configured to update each of said plurality of slave units when receiving data containing a new record, wherein said data re-arranging section comprises:

a data inserting section configured to refer to said arrangement data to insert said new record into said second block based on a second key of the same kind as that of key data which is contained in said new record to generate an insertion block in which said new record has been inserted;

a determining section configured to determine whether or not a size of said insertion block is within a first threshold value; and a re-arranging section configured to divide said insertion block into a first half and a second half to generate a fourth block and a fifth block, when the size of said insertion block is larger than said first threshold value, arrange said fourth block as an owner block in a new second slave unit, arrange a replica block of said fifth block next to said fourth block in said second slave unit, re-arrange a replica block of said fourth block in said first slave unit which retains the replica block of said second block, and re-arrange said fifth block as the owner block in said third slave unit which retains said second block.

4. The data arrangement calculating system according to claim 3, wherein said re-arranging section inserts said new record in the replica of said second block and said second block when the size of said insertion block is within said first threshold value.

5. The data arrangement calculating system according to claim 3, wherein said data re-arranging section further comprises:

a data deleting section configured to refer to said arrangement data to delete said second record from said second block, as a deletion block, when receiving a request of deleting said second record contained in said second block, wherein said determining section determines whether or not the size of said deletion block is within a second threshold value, and wherein said re-arranging section generates an integration block by integrating a third block next to said deletion block and said deletion block based on the order of the key data, when the size of said deletion block is within the second threshold value, re-arranges a replica block of said integration block in said first slave unit which retains the replica block of said second block, re-arranges said integration block as an owner block in a fourth slave unit which retains said third block, and deletes said second block in said third slave unit which retains said second block as the owner block.

6. The data arrangement calculating system according to claim 5, wherein said re-arranging section deletes said second record from said second block and the replica block of said second block, when the size of said deletion block is larger than said second threshold value.

7. A data arrangement calculating method comprising:

a master unit dividing data of records arranged in order based on key data of said records;

said master unit arranging said data which has been divided, in a plurality of slave units;

said master unit allocating a job which executes sliding window calculation every predetermined window width to each of said plurality of slave units; and each of said plurality of slave units executing the sliding window calculation based on the allocated job, wherein said dividing comprises:

dividing said data to generate blocks and replica blocks of said blocks, wherein said arranging comprises:

arranging a first block of said blocks as an owner block in a first slave unit of said plurality of slave units; and arranging the replica block of said second block next to said first block in said first slave unit, wherein said executing comprises:

said first slave unit receiving said job and executing the sliding window calculation every said predetermined window width to said first block, and wherein said executing comprises:

executing the sliding window calculation by using said first block and the replica block of said second block, when said predetermined window width extends over said first block and the replica block of said second block.

8. The data arrangement calculating method according to claim 7, wherein said arranging further comprises:

generating arrangement data in which said first block is related to said first slave unit as the owner block and the replica block of said second block is related to said first slave unit, wherein said allocating comprises:

referring to said arrangement data to recognize a kind of the key data defining the order of first records of said first block; and allocating said job and a plurality of first key data corresponding to the kind of the key data, to said first slave unit, and wherein said executing comprises:
  executing the sliding window calculation every said predetermined window width by using the plurality of first key data as start keys.

9. The data arrangement calculating method according to claim 8, further comprising:
  updating each of said plurality of slave units when said master unit receives data containing a new record,
  wherein said updating comprises:
    referring to said arrangement data to insert said new record into said second block based on second key data of the same kind as that of the key data which is contained in said new record to generate an insertion block;
    determining whether or not a size of said insertion block is within a first threshold value;
    dividing said insertion block into a first half and a second half to generate a fourth block and a fifth block, when the size of said insertion block is larger than said first threshold value;
    arranging said fourth block as an owner block in a new second slave unit;
    arranging a replica block of said fifth block next to said fourth block in said second slave unit;
    re-arranging a replica block of said fourth block in said first slave unit which retains the replica block of said second block; and
    re-arranging said fifth block as the owner block in said third slave unit which retains said second block as the owner block.

10. The data arrangement calculating method according to claim 9, wherein said updating further comprises:
  inserting said new record in the replica block of said second block and said second block when the size of said insertion block is within said first threshold value.

11. The data arrangement calculating method according to claim 8, further comprising:
  said master unit updating each of said plurality of slave units in response to a request, when receiving the request of deleting said second record which is contained in said second block,
  wherein said updating each of said plurality of slave units in response to said request comprises:
    referring to said arrangement data to delete said second record from said second block to generate a deletion block when receiving said request;
    determining whether or not a size of said deletion block is within a second threshold value;
    integrating a third block next to said deletion block and said deletion block to generate an integration block, when the size of said deletion block is within said second threshold value;
    re-arranging a replica block of said integration block in said first slave unit which retains the replica block of said second block;
    re-arranging said integration block as an owner block in a fourth slave unit which retains said third block as the owner block; and
    controlling said third slave unit which retains said second block as the owner block to delete said second block.

12. The data arrangement calculating method according to claim 11, wherein said updating each of said plurality of slave units in response to said request further comprises:
  deleting said second record from the replica block of said second block and said second block, when the size of said deletion block is larger than said second threshold value.

13. A method of arranging data in a non-transitory computer readable medium comprising:
  dividing data of records arranged in order defined based on key data of said records;
  arranging the divisions of said data in a plurality of slave units;
  allocating a job which executes a sliding window calculation every predetermined window width to each of said plurality of slave units; and
  updating each of said plurality of slave units when receiving data containing a new record,
  wherein said dividing comprises:
    generating blocks and replica blocks of said blocks from said data, and
  wherein said arranging comprises:
    arranging a first block of said blocks in a first slave unit of said plurality of slave units as an owner block;
    arranging the replica block of a second block next to said first block in said first slave unit;
    generating arrangement data by relating said first block to said first slave unit as the owner block, and relating the replica block of said second block to said first slave unit, and
  wherein said allocating comprises:
    referring to said arrangement data to recognize a kind of the key data defining an order of first records which are contained in said first block; and
    allocating a plurality of first key data corresponding to the kind of the key data and said job to said first slave unit, and
  wherein said updating comprises:
    referring to said arrangement data to insert said new record in said second block to generate an insertion block, based on a second key of the same kind as that of the key data contained in said new record;
    determining whether or not a size of said insertion block is within a first threshold value:
    dividing said insertion block to generate a fourth block and a fifth block when the size of said insertion block is larger than said first threshold value;
    arranging said fourth block as an owner block in a new second slave unit;
    arranging a replica block of said fifth block next to said fourth block in said second slave unit;
    re-arranging a replica block of said fourth block in said first slave unit which retains the replica block of said second block; and
    re-arranging said fifth block as an owner block in a third slave unit which retains said second block as the owner block.

14. The method of arranging data in a non-transitory computer readable medium according to claim 13, wherein said updating further comprises:
  inserting said new record in said second block and the replica block of said second block, when the size of said insertion block is within said first threshold value.

15. The method of arranging data in a non-transitory computer readable medium according to claim 13, further comprising:
  updating each of said plurality of slave units in response to a request when receiving the request which deletes a second record contained in said second block,
  wherein said updating each of said plurality of slave units comprises:
    referring to said arrangement data to delete said second record from said second block to generate a deletion block, when receiving said request;

determining whether or not the size of said deletion block is within a second threshold value;

integrating a third block next to said deletion block and said deletion block to generate an integration block when the size of said deletion block is within the second threshold value;

re-arranging a replica block of said integration block in said first slave unit which retains the replica block of said second block;

re-arranging said integration block as an owner block in a fourth slave unit which retains said third block as an owner block; and controlling said third slave unit which retains said second block as the owner block to delete said second block.

16. The method of arranging data in a non-transitory computer readable medium according to claim 15, wherein said updating each of said plurality of slave units comprises:

deleting said second record from a replica block of said second block and said second block when the size of said deletion block is larger than said second threshold value.

* * * * *